(12) United States Patent
Wood

(10) Patent No.: US 7,772,161 B2
(45) Date of Patent: Aug. 10, 2010

(54) PRE-ENGINEERED PILLS FOR THE IMPROVEMENT OF DRILLING MUDS

(76) Inventor: Robert R. Wood, 9434 Sotherloch Lake Dr., Houston, TX (US) 77379

( * ) Notice: Subject to any disclaimer, the term of this patent is extended or adjusted under 35 U.S.C. 154(b) by 416 days.

(21) Appl. No.: 11/593,894

(22) Filed: Nov. 7, 2006

(65) Prior Publication Data

US 2007/0111899 A1    May 17, 2007

Related U.S. Application Data

(60) Provisional application No. 60/734,611, filed on Nov. 8, 2005.

(51) Int. Cl.
*C09K 8/24* (2006.01)
*C09K 8/32* (2006.01)
*E21B 43/16* (2006.01)

(52) U.S. Cl. .................. 507/117; 507/118; 166/268

(58) Field of Classification Search .................. 507/118, 507/117; 166/294, 295, 268
See application file for complete search history.

(56) References Cited

U.S. PATENT DOCUMENTS

| | | | |
|---|---|---|---|
| 2,342,588 A | 5/1940 | Larkin | |
| 2,743,233 A | 4/1956 | Fisher | |
| 2,894,906 A | 7/1959 | Sheeler | |
| 3,158,210 A | 11/1964 | Smith et al. | |
| 3,254,064 A | 5/1966 | Nevins | |
| 3,785,438 A | 1/1974 | Jackson et al. | |
| 3,788,405 A | 1/1974 | Taylor | |
| 3,901,316 A | 8/1975 | Knapp | |
| 4,360,620 A | 11/1982 | Lindner et al. | |
| 4,510,998 A | 4/1985 | Peiffer | |
| 4,633,950 A | 1/1987 | Delhommer et al. | |
| 4,704,213 A | 11/1987 | Delhommer et al. | |
| 5,238,977 A | 8/1993 | Piejko et al. | |
| 5,779,787 A | 7/1998 | Brothers et al. | |
| 6,017,854 A | 1/2000 | Van Slyke | |
| 6,380,269 B1 | 4/2002 | Benko et al. | |
| 6,518,224 B2 * | 2/2003 | Wood | 507/118 |
| 6,806,232 B1 | 10/2004 | Cart | |
| 2002/0010100 A1 | 1/2002 | Wood | |
| 2002/0091167 A1 | 7/2002 | Benko et al. | |
| 2004/0244978 A1 | 12/2004 | Shaarpour | |

FOREIGN PATENT DOCUMENTS

SU    1121396    10/1984

OTHER PUBLICATIONS

Kirk-Othmer, Encyclopedia of Chemical Technology; 1965; pp. 297-299; vol. 7; 2nd Edition.

* cited by examiner

*Primary Examiner*—Timothy J. Kugel
*Assistant Examiner*—Aiqun Li
(74) *Attorney, Agent, or Firm*—Fulbright & Jaworski L.L.P.

(57) ABSTRACT

The invention relates to the use of pre-engineered pills for use with drilling mud. By introducing pills of ground elastomer into the well, the pills can improve the lubricity of the mud as well as aiding in wellbore cleaning, prevention of bit balling and reduction of fluid loss to thief zones.

4 Claims, No Drawings

PRE-ENGINEERED PILLS FOR THE IMPROVEMENT OF DRILLING MUDS

CROSS-REFERENCE TO RELATED APPLICATIONS

This Application relates back to Provisional (35 USC 119 (e)) application 60/734,611 filed on Nov. 8, 2005.

STATEMENT REGARDING FEDERALLY SPONSORED RESEARCH OR DEVELOPMENT

Not applicable.

REFERENCE TO A COMPACT DISK APPENDIX

Not applicable.

TECHNICAL FIELD

The invention relates to the improvement of water-based and oil-based drilling muds. The areas of enhanced performance are inclusive of but not limited to: lubricity, well bore hole cleaning, bit balling and severe lost circulation. The invention comprises the adding of ground elastomer to a designed volume of oil or oil-based mud with the intent of injecting a pre-engineered pill into an active oil or water based drilling fluid system. The pill can range from about 0.5 to about 4000 microns. The volume of an engineered pill can range from 5 gallon pails to several hundred barrels mixed in chemical pits on location. The size is determined by the volume of drilling fluid and wellbore geometry of the particular well.

BACKGROUND OF THE INVENTION

Water based drilling fluids were the first ever used and continue to be used today. Its lower cost and environment acceptance as compared to oil mud continue to make it the first opinion in drilling operations. The following chart is an overview of the performance issues for respective systems.

| General Mud Category | Lubricity | Shale Reactivity | Hole Cleaning | Severe Lost Circulation |
|---|---|---|---|---|
| Water-based | Poor | Poor | Good | Poor |
| Oil-based | Good | Very Good | Poor | Very Poor |

Daily drilling fluid operations dictate that the fluid engineer make regular chemical treatments to maintain API mud properties. This proposal addresses those times when the treatment of an entire system may either be deemed to expensive or not necessary. The introduction of pre-engineered pills to the system to achieve a desired goal is a long standing operation. For example: whenever the pipe is pulled out of the well to replace the bit, a "slug" is pumped. A slug is a pre-engineered pill of existing mud mixed with barite to increase the density of the pill above that of the entire system. By pumping this pill into the drill pipe, the hydrostatic column of the fluid will fall and when the pipe connections are broken, the pipe will be dry, thus preventing mud from getting on the rig personnel and equipment. These slugs are generally built on location in the slugging pit. Another example of a pill not built on location are spotting fluids. These are pre-engineered blends which are made at a vendor's shop and stored at the wellsite in tanks which can be easily accessed when stuck pipe may occur. This is discussed in U.S. Pat. No. 4,876,017.

This invention utilizes both scenarios to deliver a pre-engineered blend of elastomer and oil for the purposes previously stated.

Lost Circulation—Severe

In U.S. Pat. No. 6,518,224, Wood teaches how the use of elastomer particles added to a an oil based drilling fluid can effectively manage the whole mud losses encountered while drilling. This technique as taught has proven to be very effective yet in situations of 100% losses alternative remedies have been tried. These include, but not limited to, pills spotted at the lost zone comprised of cross-link polymers, diatomaceous earth, fibers and cement. Also combinations of these products have been tried with some or limited success. This invention teaches how the use of a high concentration of elastomer added to the base fluid in a pre-engineered manner can result in a pill that will "lock-up" downhole by absorbing the available oil and thus stopping the flow of free oil into the thief zone. Furthermore the expansion capability of the elastomer, as taught by Wood will then have time to take effect within the fractures to form a flexible seal that allows drilling to resume. The further advantage is that since the pill can be engineered with a compatible fluid to the existing system, when drilling resumes the pill will wash out of the open hole and not contaminate the active drilling fluid. Most of the pills currently used for this application are mixed in water which is a contaminant to oil based fluids. When drilling resumes with these water-based pills in the well, it must either be disposed of or incorporated into the system creating an additional step with associated cost.

This method can also be applied to water based fluids though the applications are not as common. Dependent on the environmental compliance of the drilling site, the pill and its oil can be incorporated into the system with a resulting improvement in lubricity and bit balling as noted in those sections.

Shale Reactivity/Bit balling

One of the primary rocks encountered when drilling is smectite. This rock is highly reactive in an aqueous environment and takes on a "gummy or sticky" texture. As drilling proceeds, this material begins to cling to the drill bit and the bottom hole assembly (BHA). This "mud ring" can completely cover the teeth of the bit thus greatly slowing drilling and impact the BHA in such a way that when pulling pipe out of the hole that the well swabs creating a well control problem. Traditionally, the industry has dealt with this problem by adding oils and surfactants to wash the bit and BHA. Ground particles such as walnut have also been circulated through the well in an attempt to scour the bit and BHA. These practices have shown some success as demonstrated by torque gauges and drill rates monitored on the drilling rig.

Lubricity

There are two parameters of a drilling fluid that can be altered to improve the lubricity of water and oil based muds. First is the lubricity coefficient of the external phase of the system. Secondly is the introduction of particles that become offsets within the wellbore providing a surface for the drilling assembly to contact rather than the casing or formation.

Oil based mud has an inherent advantage over water based systems due to the lower coefficient of friction in the external phase of the mud which is oil versus water. However, even in the oil based muds solid particulate has proven to reduce torque and drag in highly deviated or narrow hydraulic clearance.

In water based mud, the addition of non-aqueous products has been the primary method for increasing lubricity. A limitation of this method is the oils are emulsified into the water fraction after several circulations and the oil must continue to be added in order to remain external in the system thereby being externally available to lubricate the walls of the well.

Solid lubricants have primarily been polymer and glass drill beads. They are touted to form a ball bearing effect downhole. Concerns and limitations with beads are they get circulated out of the hole which is why recycling equipment must be employed and they can pose a safety hazard on the rig to personnel when they are accidentally spilled in the work area.

Hole Cleaning/Cuttings Removal

One of the major functions of a drilling fluid is the removal of cuttings made by the bit. The application of this invention is for the pill to be used in an oil based system. Water based systems operate with a different chemistry and can provide sufficient hole cleaning with existing rheological modifiers. To generate viscosity in oil-based drilling fluids two methods are employed. First, the amount of water emulsified into the oil will increase viscosity and secondly, organophillic clays and polymers are added to improve the rheology for hole cleaning. Various rheological models are employed within the industry to monitor hole cleaning. Examples of these models include but are not limited to Bingham Plastic and Power Law. According to most models, by increasing the density or plastic viscosity of a fluid, the lifting capacity of that fluid will be improved resulting in superior hole cleaning. For this reason, operations often pump a concentrated pill of barium sulfate (barite) which will increase both the density and plastic viscosity to clear the wellbore of cuttings. This pill will normally cover several hundred feet of hole length therefore volumes will vary dependent on the hole geometry. The limitation of this treatment is the increased density of the pill adds to the total hydrostatic pressure which may exceed the formation fracture gradient. In this scenario the high density pill will cause a fracture with resulting loss circulation. Furthermore, these pills create a buildup of density for the entire system when they return to the surface.

BRIEF SUMMARY OF THE INVENTION

The invention involves the preparation of customized "pills" of ground elastomers which has been pretreated and impregnated with one or more non-aqueous fluids. These pills are then introduced into a water based or an oil-based drilling mud and circulated through the well during the drilling operation. The pills may be circulated without stopping as in cases where lubricity, hole cleaning and bit balling need to be addressed. In severe lost circulations the pill will be spotted across the thief zone and allowed to sit or even 'squeezed' into formation with pressure in a method known as a bradenhead squeeze.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DETAILED DESCRIPTION OF THE INVENTION

A concentrated pill of ground elastomer is prepared and introduced into a water or oil-based drilling mud.

The concentrated "pill" is prepared by mixing approximately 1 to 100 pounds (about 0.45 to about 45 kg) of ground elastomer per barrel (about 15.9 deciliters) of a non-aqueous fluid or an oil-based drilling mud. The ground elastomer is mixed with the non-aqueous fluid for sufficient time to insure that the ground elastomer is pretreated and impregnated with the non-aqueous fluid. The ground elastomer may or may not be treated with a surfactant or coupler to make it water wettable. Even when added to a water based mud it is desirous that the rubber only wet with the oil.

The ground elastomer generally comprises elastomers which have been cross-linked and ground to a particle size of from about 0.5 to about 4000 microns. Typically the ground elastomer comprises a mixture of particles of varying sizes within this range. In one embodiment, the ground elastomer is obtained by grinding vehicle tires. This particular source of ground elastomer is commonly referred to as "crumb rubber." Another source is known as buffings.

The non-aqueous fluid used to prepare the pill comprises a hydrocarbon which can impregnate the ground elastomer particles. Non-aqueous fluids useful in the practice of the invention include but are not limited to; diesel, mineral oil, paraffin, linear alpha olefins, polyalpha olefins, isomerized or internal olefins, esters or oil-based muds. These muds have already been made using the aforementioned oils.

The pills can be prepared either on site or at a remote location and then transported to the drilling site for use. When the pill is prepared on site, the ground elastomer and non-aqueous fluid should be in contact with each other for a period sufficient to insure that the non-aqueous fluid has impregnated the elastomer particles. This will typically run from about 15 to 30 minutes.

Once the pill has been prepared for pumping, it is then combined with the drilling fluid to achieve one or a combination of the four objectives previously outlined.

Bit Balling

In this embodiment, a concentrated pill is pumped down the drill pipe to the bit and BHA. The ground elastomer acts as a scouring agent along with a non-aqueous fluid absorbed on the elastomer. The dual-function product will both scour the bit and BHA exposing the metal surfaces and coating the surfaces with the oil. This simultaneous scouring and coating of the bit and BHA has been shown to prevent or reduce bit balling.

Lubricity

In this embodiment, the ground elastomer is impregnated with a non-aqueous fluid either to saturation or some point less than saturation. It is then added to a water based fluid. The impregnated elastomer is added into the active system of the drilling fluid and circulated down the wellbore. The hydrophobic qualities of the elastomer are such that the oil continues to adhere to the rubber even in the presence of lignin, surfactants and other products found in water based drilling fluids that are capable of emulsifying oil that is added alone.

The impregnated rubber adheres to the walls of the wellbore and acts not only as an offset surface similar to that found in drilling beads and ground walnut but adds the additional feature of providing the corresponding coefficient of friction relative to the oil being used. In oil based fluids the pill provides an offset to the formation or casing thus reducing torque and drag. In all systems the elastomer and oil will reduce casing wear as byproduct of preventing the drillpipe from dragging on the casing.

Wellbore Cleaning

In this embodiment, the pill is prepared so that the plastic viscosity is increased to achieve a higher lifting capacity as determined by industry rheological models. The increase should not contribute to the total system hydrostatic pressure whereby it would exceed the fracture gradient of the rock being drilled. The pill is circulated through the well and excess cuttings and particles from the pill are removed by the solids separation units. The use of ground elastomers to clean the wellbore has the advantage of not increasing the density of the fluid because the specific gravity of crumb rubber is 1.0-1.2 as compared to a specific gravity of a common mixture used for cleaning wellbore, barite which has a specific gravity of about 4.2. These pills can be circulated at regular or irregular intervals as determined by hole conditions.

Thief Zone Locking/Severe Lost Circulation

In this embodiment, a pre-engineered pill comprising ground elastomer at the highest possible concentration that can successfully be pumped is prepared. The final concentration will be determined by the density of the pill and the other API mud properties as determined by the fluid engineer. The pill is pumped or spotted over the thief zone. This 'spotting' can be done down the drill pipe or down the annulus. Once spotted in place pumping ceases. A 'squeeze' pressure may or may not be applied. This technique known as a Bradenhead Squeeze is a method commonly employed with other pills.

With temperature and several hours the pill will absorb all free oil and rheologically lock up thus forming a plug which will stop losses and allow drilling operations to resume. The particles which penetrate the fractures will continue to expand as taught by Wood but the high concentration in these pills along with the 1-6 hours of spotting time allow for deeper penetration and maximum expansion in fractures which cause losses up to 100%. The addition of a squeeze pressures allows for even deeper penetration of the sealing plug.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for cleaning a wellbore comprising the step of: circulating a pill comprising a scouring agent through the wellbore, wherein the scouring agent further comprises ground elastomer particles wherein the size of the ground elastomer particles ranges from 0.5 to 4000 microns, wherein the ground elastomer particles is capable of only having a non-aqueous fluid or an oil-based drilling mud absorbed by the ground elastomer particles, and wherein the elastomer particles expose metal surfaces of the wellbore and the non-aqueous fluid or the oil-based drilling mud coats the exposed metal surfaces.

2. The method of claim 1 wherein the non-aqueous fluid is selected from the group consisting of diesel, mineral oil, linear alpha olefins, polyalpha olefins, isomerized, olefins, esters and oil-based muds.

3. A method for preventing flow of oil into a thief zone comprising introducing a pill containing ground elastomer into a well such that the pill locks up in the region of the thief zone, wherein the pill of ground elastomer particles further comprise elastomer particles with sizes ranging from 0.5 to 4000 microns, wherein the pill of ground elastomer particles are capable of only having a non-aqueous fluid or an oil-based drilling mud absorbed by the ground elastomer particles.

4. A method of claim 3 wherein the non-aqueous fluid is selected from the group consisting of diesel, mineral oil, linear alpha olefins, polyalpha olefins, isomerized olefins, esters and oil-based muds.

\* \* \* \* \*